(12) United States Patent
Hamran

(10) Patent No.: US 10,537,093 B2
(45) Date of Patent: Jan. 21, 2020

(54) ELECTRONIC GAS DISPENSER CONTROL SYSTEM HAVING BACKFLOW AND PRESSURE SENSORS

(71) Applicant: Mark O. Hamran, Plant City, FL (US)

(72) Inventor: Mark O. Hamran, Plant City, FL (US)

(*) Notice: Subject to any disclaimer, the term of this patent is extended or adjusted under 35 U.S.C. 154(b) by 0 days.

(21) Appl. No.: 15/730,102

(22) Filed: Oct. 11, 2017

(65) Prior Publication Data
US 2019/0104709 A1   Apr. 11, 2019

(51) Int. Cl.
| *F16K 31/02* | (2006.01) |
| --- | --- |
| *A01K 63/00* | (2017.01) |
| *B01F 15/00* | (2006.01) |
| *B01F 15/04* | (2006.01) |
| *A01K 63/04* | (2006.01) |

(52) U.S. Cl.
CPC .......... *A01K 63/003* (2013.01); *A01K 63/042* (2013.01); *B01F 15/00162* (2013.01); *B01F 15/0416* (2013.01)

(58) Field of Classification Search
CPC ............... A01K 63/003; A01K 63/042; B01F 15/00162; B01F 15/0416; B01F 15/0429; Y04S 40/124; Y04S 40/126; Y04S 40/16; Y04S 40/12; F16K 37/0091
USPC ...................................................... 137/487.5
See application file for complete search history.

(56) References Cited

U.S. PATENT DOCUMENTS

| 3,921,670 | A | * | 11/1975 | Clippard, Jr. | F16K 31/0606 137/625.27 |
| --- | --- | --- | --- | --- | --- |
| 5,062,446 | A | * | 11/1991 | Anderson | G05D 7/0635 137/468 |
| 6,039,005 | A | * | 3/2000 | Themar | A01K 63/003 119/249 |
| 6,343,617 | B1 | * | 2/2002 | Tinsley | G05D 7/0635 137/486 |
| 6,725,167 | B2 | * | 4/2004 | Grumstrup | G05D 7/0635 137/487.5 |
| 8,851,105 | B2 | * | 10/2014 | Kashima | G01F 1/6847 137/486 |
| 8,875,732 | B2 | * | 11/2014 | Cloud | A23G 9/20 137/487.5 |
| 9,019,122 | B2 | * | 4/2015 | Heller | G08C 15/06 137/1 |
| 9,027,585 | B2 | * | 5/2015 | Smirnov | F17D 1/16 137/486 |
| 9,527,046 | B1 | * | 12/2016 | Roe | B01F 3/0446 |
| 2002/0174899 | A1 | * | 11/2002 | Adams | G05D 7/0635 137/487.5 |
| 2002/0189682 | A1 | * | 12/2002 | Linthorst | G01S 5/0009 137/487.5 |
| 2007/0242688 | A1 | * | 10/2007 | McFarland | H04L 12/2803 370/445 |
| 2007/0246102 | A1 | * | 10/2007 | McDonald | G05D 7/0635 137/487.5 |
| 2011/0042597 | A1 | * | 2/2011 | Huculak | F16K 31/082 251/129.15 |
| 2011/0168640 | A1 | * | 7/2011 | Gilmour | B01F 3/04503 210/703 |
| 2012/0323392 | A1 | * | 12/2012 | Gerdes | H04L 12/2827 700/296 |

(Continued)

Primary Examiner — Minh Q Le
(74) Attorney, Agent, or Firm — Cygent IP Law, P.A.; Steven W. Aycock, II

(57) ABSTRACT

An electronic gas dispenser control system having backflow and pressure sensors is described.

16 Claims, 4 Drawing Sheets

(56) References Cited

U.S. PATENT DOCUMENTS

| | | | | |
|---|---|---|---|---|
| 2013/0092257 A1* | 4/2013 | Yasuda | ............... | G01F 25/0053 |
| | | | | 137/487 |
| 2013/0300643 A1* | 11/2013 | Pedersen | ................ | H04B 17/23 |
| | | | | 345/156 |
| 2014/0261213 A1* | 9/2014 | Stiles, Jr. | ............. | A01K 63/047 |
| | | | | 119/245 |
| 2015/0272089 A1* | 10/2015 | Yu | ........................ | A01K 63/042 |
| | | | | 366/150.1 |
| 2016/0166996 A1* | 6/2016 | Burkley | ................ | B29B 7/7428 |
| | | | | 366/182.2 |
| 2018/0008951 A1* | 1/2018 | Van Hoeve | .......... | B01J 19/0093 |
| 2018/0106698 A1* | 4/2018 | Karg | ................... | G01M 3/2876 |

* cited by examiner

ELECTRONIC GAS DISPENSER CONTROL SYSTEM HAVING BACKFLOW AND PRESSURE SENSORS

FIELD

Some implementations relate to gas dispensing equipment, and in particular, to an electronic gas dispenser control system having backflow and pressure sensors.

BACKGROUND

For aquatic enthusiasts and professionals, developing and maintaining a thriving aquarium environment can include giving attention to factors beyond the selection of an aquarium environment and a collection of aquatic plants. In order to produce the organic plant materials necessary for their survival and growth, aquatic plants, like any plants, must extract carbon dioxide from the atmosphere and undergo the process of photosynthesis. During this process, a plant removes carbon dioxide gas from the atmosphere and combines the gas with water. In the ensuing chemical reaction, the carbon dioxide and water combine with light energy to create oxygen gas, which is released from the plant, and hydrogen compounds, which the plant uses for chemical energy in a process called photophosphorylation. The amount of carbon dioxide needed during photosynthesis depends directly upon the amount of light energy available.

In aquarium environments without supplemental lighting, for example, low light conditions may exist. These low light conditions may reduce the amount of carbon dioxide needed for photosynthesis. In these cases, the amount of carbon dioxide dissolved naturally in the aquarium environment may be of insufficient concentration for existing aquatic plants to undergo photosynthesis. In order for the plants to thrive and grow, however, it may be necessary to increase available levels of both light and carbon dioxide gas. By adding only supplemental lighting to an aquarium environment, photosynthesis of the aquatic plants may be limited by inadequate amounts of carbon dioxide naturally present in the aquarium environment.

To overcome the problem of an inadequate concentration of dissolved carbon dioxide gas in an aquarium environment, it is known to inject carbon dioxide gas into the aquarium environment to increase this concentration. A number of existing methods for injecting carbon dioxide gas into a liquid exist on the market. In one method of continuously injecting carbon dioxide gas into a liquid, a regulated supply of carbon dioxide gas is employed. The regulated supply of carbon dioxide gas may be directed into an aquarium environment with a section of tubing. Apparatus to aid in the dissolution of a gas with water, such as gas reactors, mixing stones, or other similar apparatus, may be attached about the aquarium environment end of the tubing to increase the rate at which carbon dioxide gas is absorbed into the aquarium environment.

In order to provide a means for controlling the concentration of carbon dioxide gas introduced into an environment, a number of apparatus have been developed, including those which combine a gas regulator with a solenoid valve in a manner so that the solenoid opens the valve to allow the carbon dioxide gas to enter the aquarium environment until the desired concentration of the gas has been achieved in the aquarium environment, and then closes to selectively block the flow of carbon dioxide gas when the desired concentration of the gas has been achieved in the aquarium environment. When the concentration drops below a threshold concentration, the solenoid then again opens and allows the flow of gas to resume to the aquarium. Among the problems with this manner of controlling the concentration of carbon dioxide is a lack of precision. As the flow of gas is blocked and resumed, the gas concentration within the aquarium environment fluctuates.

Furthermore, certain applications in salt water aquarium environments require the injection of controlled amounts of gases. Specifically, certain levels of calcium are required in a salt water environment so that the shells of invertebrates may develop, such as the shells of mollusks or snails. One method of maintaining adequate levels of calcium in a saltwater environment is by dissolving a controlled amount of a calcium-based substrate using a calcium reactor. At normal aquarium pH levels, calcium from the substrate is insoluble. However, carbon dioxide gas can be injected into the reactor chamber containing the substrate, thereby lowering the pH of the water contained within the chamber. At this lower pH, calcium from the substrate dissolves into the water. In order to control the rate at which the calcium dissolves, and therefore the concentration of calcium in the aquarium environment, it is necessary to control the rate at which gas is injected into the calcium reactor.

Because the relationship between the concentration of carbon dioxide gas and available light energy is important for the health of aquatic life, particularly aquatic plant life, a precise means of adding carbon dioxide gas to an aquatic environment and thereby helping to control the concentration of carbon dioxide gas within an aquatic environment is needed.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

DETAILED DESCRIPTION

Figure 1:
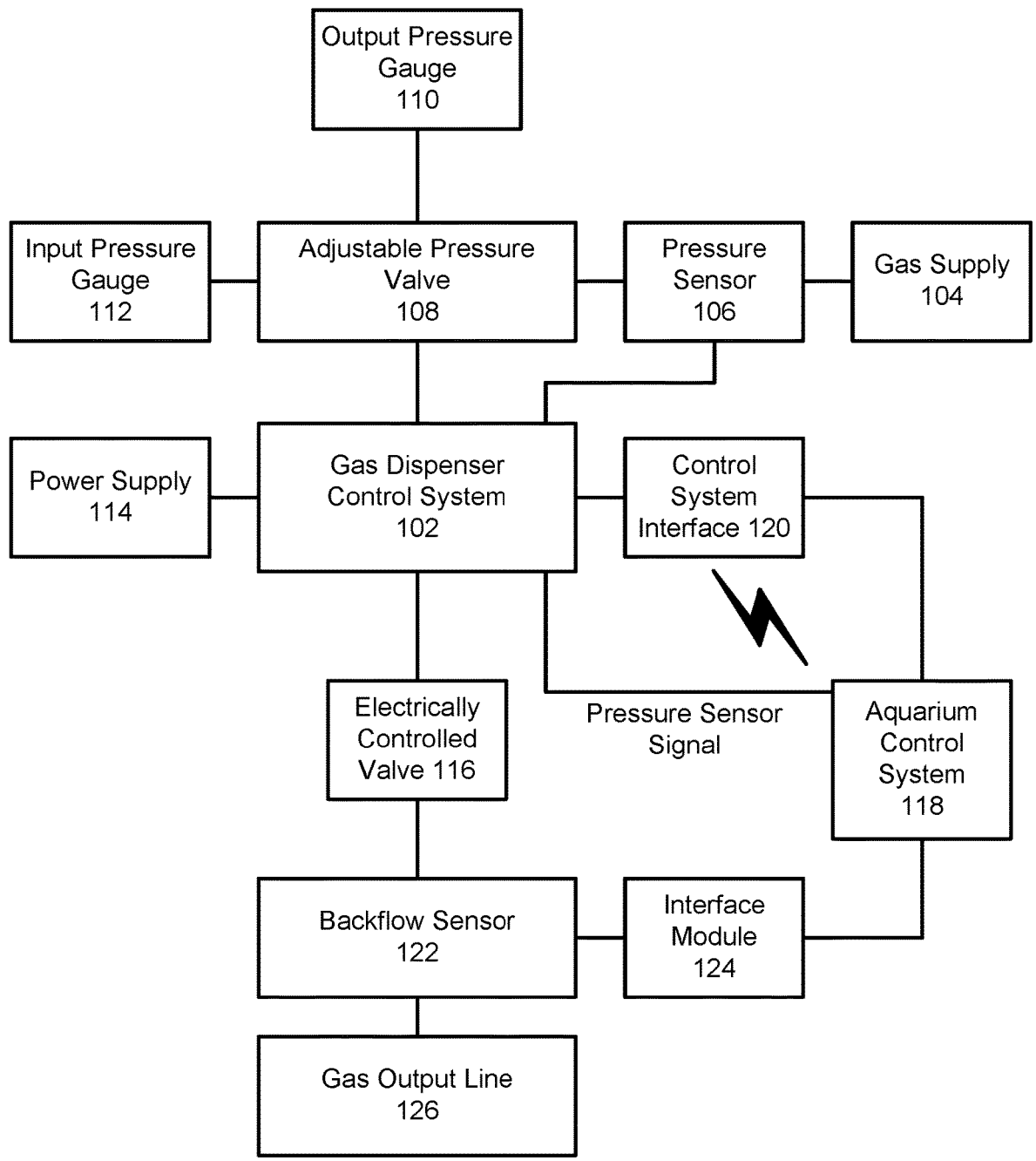
FIG. 1 is a block diagram of an example electronic gas dispenser controller having backflow and pressure sensors and an example operational environment in accordance with some implementations.

FIG. 1 is a block diagram of an example electronic gas dispenser controller 102 having a backflow sensor 122 and a pressure sensor 106 and an example operational environment 100 in accordance with some implementations. A gas supply 104 (e.g., a pressurized carbon dioxide tank, a gas supply line, or other pressurized gas supply source) provides a gas at a first pressure through a gas supply line to an optional pressure sensor 106 and in turn to an adjustable pressure valve 108. The pressure sensor 106 can be a sensor that is calibrated to provide a signal when the pressure from the gas supply 104 reaches a threshold (e.g., when the CO2 cylinder pressure is at a level that a user needs to be alerted so that a replacement cylinder can be obtained before the gas supply runs out). The pressure sensor 106 may provide a continuous or intermittent signal that correlates to the pressure of the gas from the gas supply 104, or the pressure sensor 106 may provide a signal when the gas pressure from the gas supply 104 reaches a threshold level. The pressure sensor signal may be provided to the gas dispenser controller system 102 and, in turn, as an output signal 128 to an aquarium control system 118 (or other control or monitoring system).

The adjustable pressure valve 108 is a valve that takes in gas at a first pressure from a gas supply (e.g., 104) and outputs gas at a second pressure that is typically lower than the first pressure, but may be the same or different from the first pressure. The adjustable pressure valve 108 includes a manual or automatic adjustment device that is used to set the second pressure level. An output pressure gauge 110 shows the output pressure (or second pressure) and an input pressure gauge 112 shows the input pressure (or first pressure). The gas output at the second pressure is supplied to an electrically controlled valve 116 that is controlled by the gas dispenser control system 102.

The electrically controlled valve 116 can include a valve such as the Clippard Mouse Valve manufactured by Clippard Instrument Laboratory, Inc. of Cincinnati, Ohio. The Clippard Mouse valve includes a "spider" as its only moving part. When the valve is energized or actuated by electrical signal, the spider travels a small distance (e.g., about 0.007 inch) to permit the valve to open and release gas. The timing of the valve opening and closing is controlled by the gas dispenser controller 102. The amount of gas released by the electrically controlled valve 116 depends on one or more of the following: pressure of the gas input to the valve, distance that the spider travels, and the amount of time that the valve is open. It will be appreciated that other electrically controlled valves can be used.

As mentioned above, the pressure of the gas output from the adjustable pressure valve 108 is controlled by a pressure setting device (manual or automatic) in the adjustable pressure valve 108. The distance that the spider travels in a mouse valve is determined by the construction of the valve. The amount of time that the valve is open is controlled by the gas dispenser system 102 and can be a fixed or variable time period. The three above factors determine the amount of gas in a bubble released by the electrically controlled valve 116 when it is actuated. The amount of gas that is dispensed depends on two factors: the amount of gas in the bubble released and the frequency of releasing the bubbles.

In some implementations, the amount of time that the valve opens may be a fixed parameter within the gas dispenser control system 102, the mouse valve travel is fixed at manufacturing time, thus the two factors that a user can control to determine the amount of gas dispensed by the gas dispenser control system are the pressure output from the adjustable pressure valve 108 and the frequency of releasing bubbles. Assuming the adjustable pressure valve 108 is set to a given output pressure setting and not changed frequently, the amount of gas dispensed is then controlled primarily by the frequency of releasing bubbles from the electrically controlled valve 116.

The frequency of releasing bubbles from the electrically controlled valve 116 is controlled by the gas dispenser control system 102 in response to a control signal received from the aquarium control system 118 via a control system interface 120. The control system interface 120 can be a standalone interface or can be integrated with the gas dispenser control system 102, and can include a wired or wireless interface (e.g., Wi-Fi, Bluetooth, etc.). The gas bubbles can be released to an external setting (e.g., an aquarium or other external device or apparatus) via a gas output line 126. The aquarium control system 118 can include a system such as the Apex aquarium control system or the like. For example, the aquarium control system 118 may provide a control signal that varies voltage (e.g., 0-10V) to correspond to a desired control level. The gas dispenser control system 102 can receive the control signal via the control system interface 120 and release gas bubbles at a frequency corresponding to the voltage level of the control signal. For example, the 0-10V signal may be mapped to a bubble frequency of 10 seconds per bubble to 4 bubbles per second as shown at 208 in the example control panel of FIG. 2.

The gas dispenser control system 102 can also control the frequency of bubble release according to manual control settings. The manual control setting can be controlled as described below in connection with FIG. 2. The gas dispenser control system 102 can include a processor (e.g., a microcontroller), discrete electronic circuitry, or a combination of the above to accomplish the control functions as described herein.

A backflow sensor 122 can also be included. The backflow sensor 122 is arranged to detect a backflow of water into the gas output line 126. For example, in an aquarium application, a risk exists that water may flow back into a gas line and potentially damage components of the gas dispensing system. In order to detect this backflow condition and alert a user, the backflow sensor 126 can be placed in line between the electrically controlled valve 116 and the gas output line 126. If water enters the gas output line 126 and reaches the backflow sensor 122, the backflow sensor 122 can provide a signal to the aquarium control system 118 (and/or optionally to the gas dispenser system 102) directly or via an interface module 124. The interface module may provide power to the backflow sensor 122 and/or condition the signal to be provided to the aquarium control system 118 and/or the gas dispenser control system 102.

A power supply 114 supplies power to the gas dispenser controller 102. The power supply can include an AC adapter, batteries, or other power supply.

Figure 2:
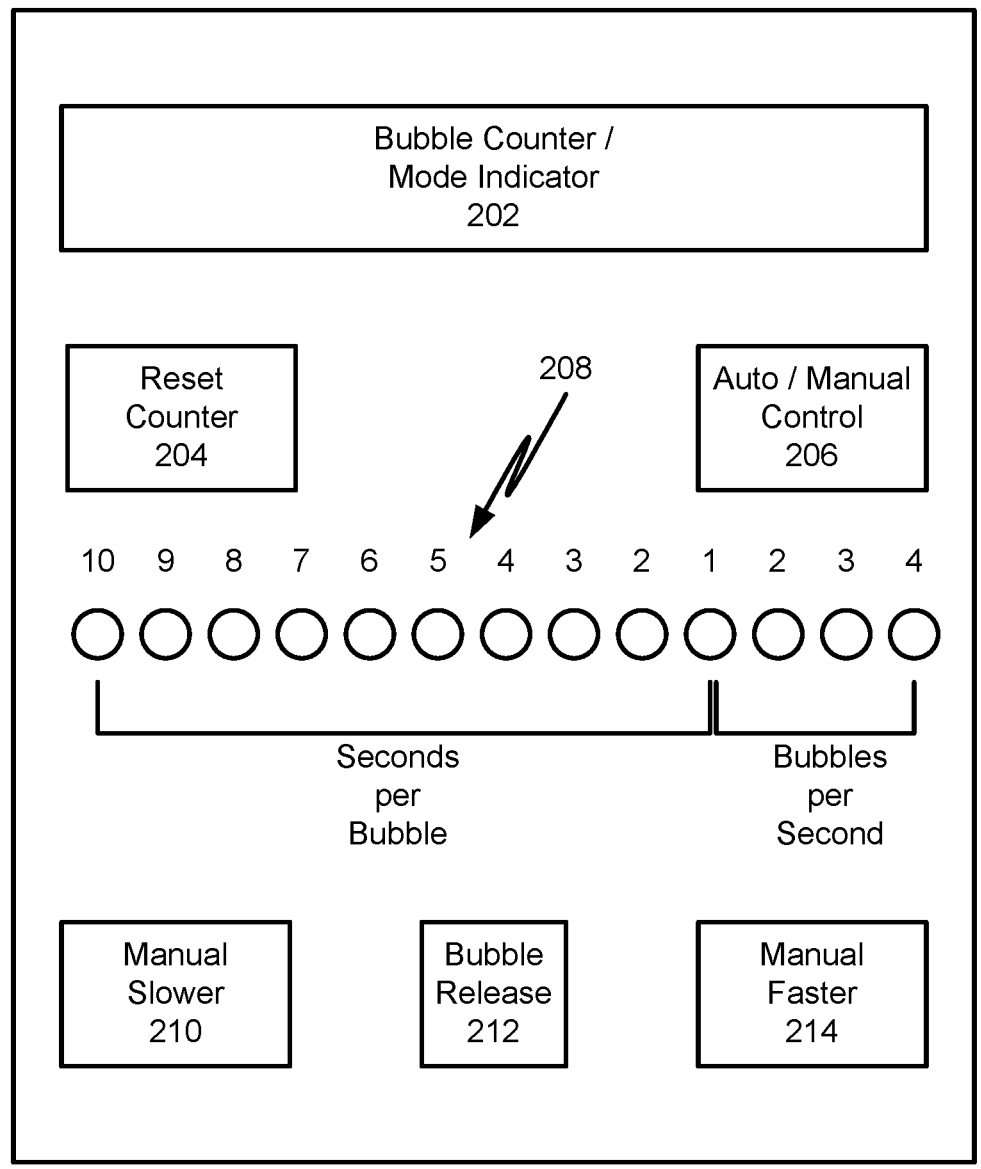
FIG. 2 is a diagram of an example control panel for an electronic gas dispensing controller having backflow and pressure sensors in accordance with some implementations.

FIG. 2 is a diagram of an example control panel 200 for an electronic gas dispenser control system having backflow and pressure sensors in accordance with some implementations. The control panel 200 includes a bubble counter/mode indicator display 202, a reset counter button 204, an auto/manual control button 206, a bubble release frequency display 208, a manual slower button 210, a bubble release indicator 212, and a manual faster button 214.

In operation, the bubble counter/mode indicator display 202 can display a bubble count, which represents the number of gas bubbles released since the count was reset, and the mode that the gas dispenser control system 102 is in (e.g., manual or automatic). The reset counter button 204 when pressed causes the bubble count to be reset back to a starting point (e.g., 0). The auto/manual control button 206 when pressed transitions the gas dispenser control system 102 between the automatic and manual operating modes.

The bubble release frequency display 208 shows the current setting of the frequency of bubble release. When in manual mode, the manual slower button 210 is used to slow the frequency of bubble release. The frequency of bubble release may be limited on the slow end by the range of the gas dispenser control system 102 (e.g., 10 seconds per bubble). When in manual mode, the manual faster button 214 is used to speed up the frequency of bubble release. The frequency of bubble release may be limited on the fast end by the range of the gas dispenser control system 102 (e.g., 4 bubbles per second). The bubble release indicator 212 (e.g., visual indicator such as an LED and/or an audible indicator) can provide an indication of bubble release. For example, an LED bubble release indicator can blink each time the gas dispensing controller 102 causes the electrically controlled valve 116 to release a bubble of gas.

Figure 3:
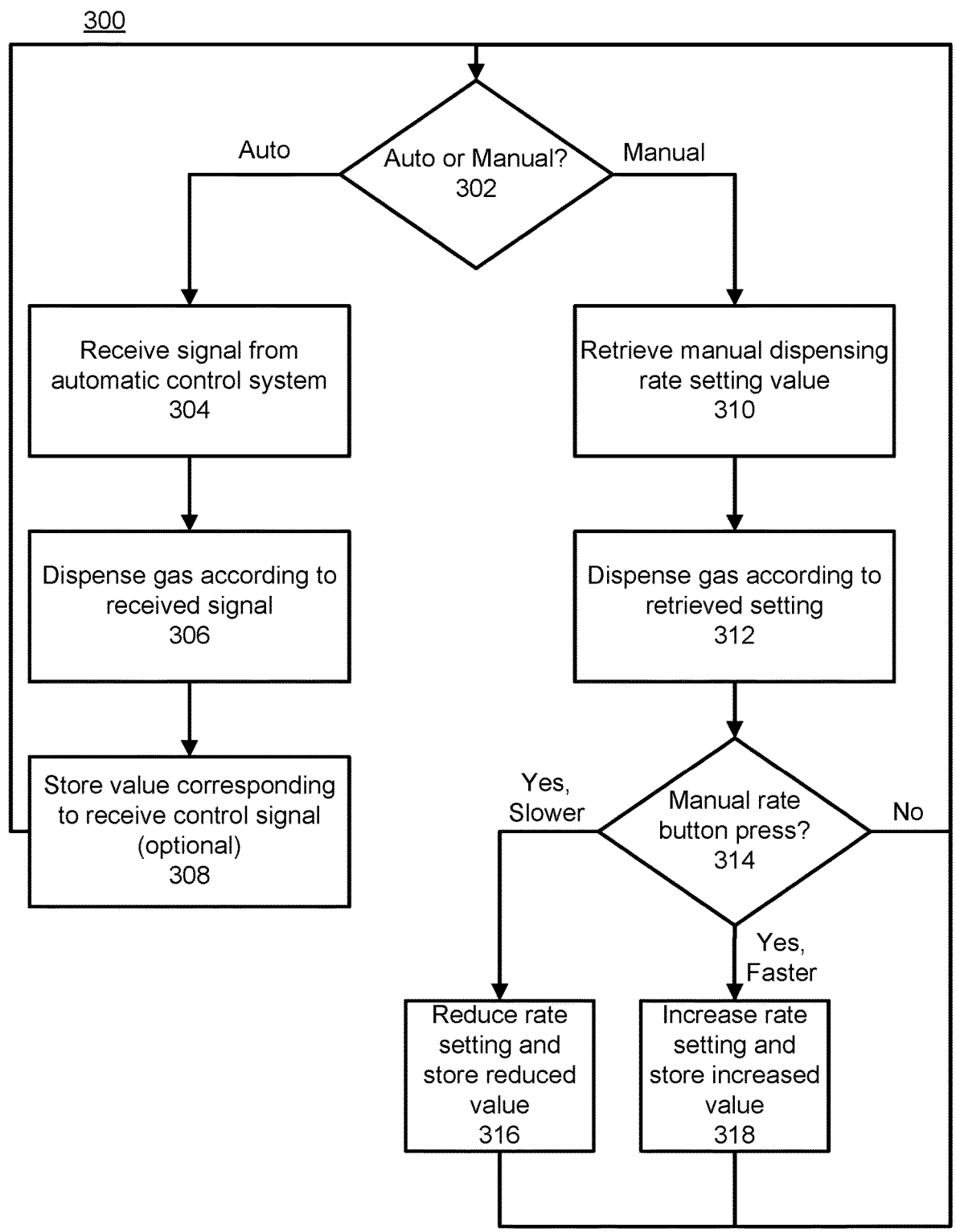
FIG. 3 is a flow chart of an example method for controlling an electronic gas dispensing controller having backflow and pressure sensors in accordance with some implementations.

FIG. 3 is a flow chart of an example method 300 for controlling an electronic gas dispensing controller having backflow and pressure sensors in accordance with some implementations. Control begins at 302, where it is determined whether the system (e.g., 102) is in automatic or manual mode. If in automatic mode, control continues to 304. If in manual mode, control continues to 310.

At 304, a control signal is received at the gas dispenser control system. For example, a control signal can be received from an aquarium control system (e.g., 118). Control continues to 306.

At 306, the gas dispenser control system dispenses gas according to the received control signal. For example, the gas dispenser control system dispenses gas bubbles at a frequency based on the received control signal (e.g., via a mapping of a 0-10V signal to a bubble release frequency range of 10 sec/bubble to 4 bubble/sec). Control continues to 308.

At 308, a value corresponding to the received control signal is optionally stored in the gas dispenser control system. Control continues to 302.

At 310, retrieve manual bubble dispensing frequency. For example, the setting may be a stored default value (e.g., mid range value or low setting value) when the unit first powers up, the most recently used manual setting (e.g., a stored manual setting from steps 316 or 318), or the most recently used automatic setting (e.g., from the stored value corresponding to the received control signal). The bubble dispensing frequency setting may be retrieved from a nonvolatile computer memory in the gas dispenser control system (e.g., memory 408). Control continues to 312.

At 312, the gas dispenser control system causes the electrically controlled valve to dispense gas bubbles according to the frequency retrieved in 310. Control continues to 314.

At 314, the system determines if a manual control button has been pressed. If the slower button was pressed control continues to 316. If the faster button was pressed, control continues to 318. If no button was pressed, control continues to 302.

At 316, the system reduces the frequency by a number of levels according to the number of times the slower button was pressed (down to the lower limit) and stores the reduced frequency value as the new manual dispensing frequency value. Control continues to 302.

At 318, the system increases the frequency by a number of levels according to the number of times the faster button was pressed (up to the higher limit) and stores the increased frequency value as the new manual dispensing frequency value. Control continues to 302.

It will be appreciated that one or more of 302-318 can be repeated in whole or in part, or in different orders than the example shown in FIG. 3.

Figure 4:
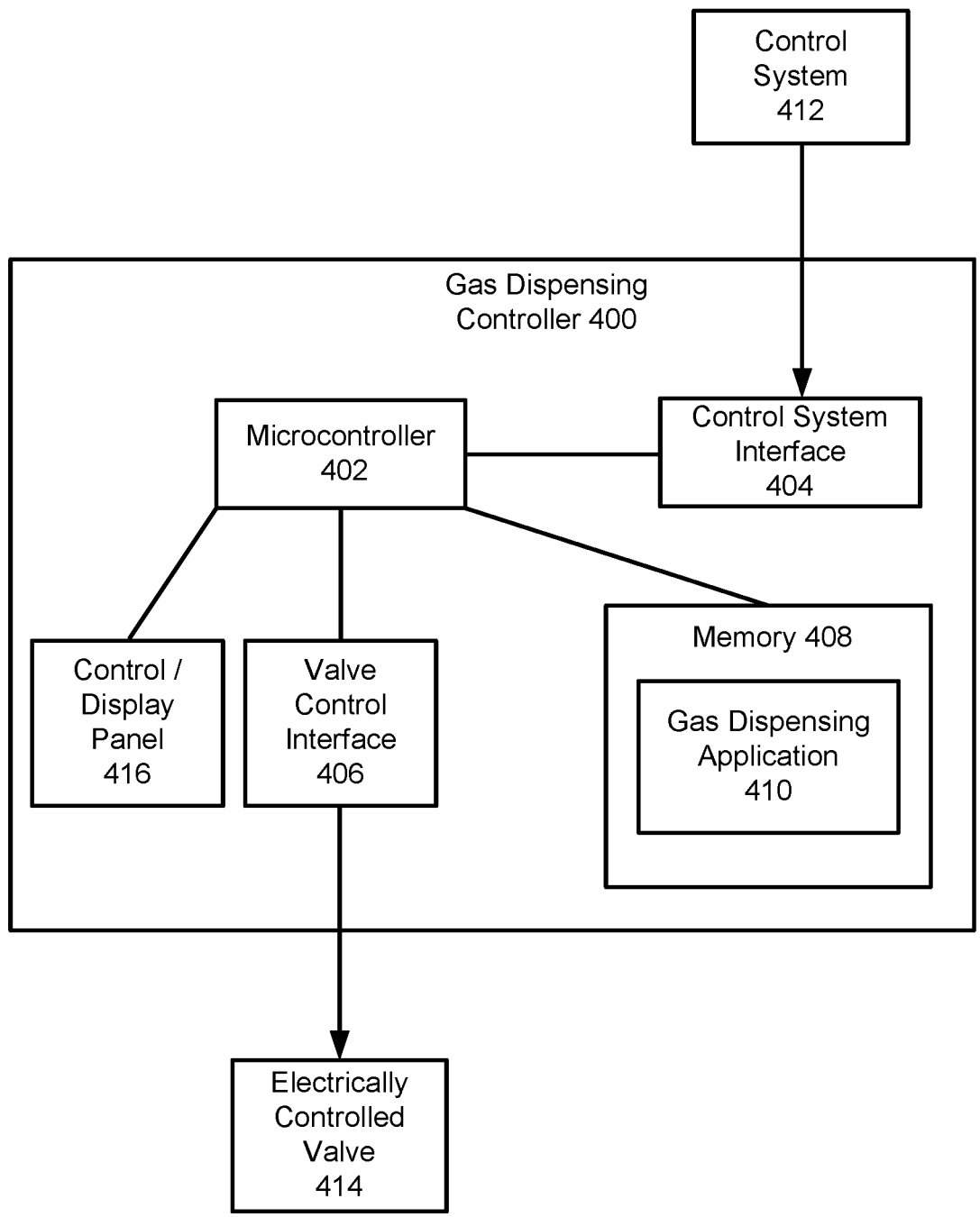
FIG. 4 is a block diagram of an example gas dispenser controller in accordance with some implementations.

FIG. 4 is a block diagram of an example gas dispenser control system processing device 400 which may be used to implement one or more features described herein. In one example, device 400 may be used to implement a computer device, e.g., an electronic gas dispensing controller such as 102, and perform appropriate method implementations described herein (e.g., one or more of the steps shown in FIG. 3). Device 400 can be any suitable computer system, server, or other electronic or hardware device. For example, the device 400 can be a dedicated embedded system, an aquarium control system or sub-system, a desktop computer, a workstation, a portable computer, or an electronic device (portable device, mobile device, cell phone, smart phone, tablet computer, television, TV set top box, personal digital assistant (PDA), media player, game device, wearable device, etc.). In some implementations, device 400 includes a processor 402, a control system interface 404, a valve control interface 406, a memory 408, and a gas dispensing software application 410.

Processor 402 can be one or more processors and/or processing circuits to execute program code and control basic operations of the device 400. A "processor" includes any suitable hardware and/or software system, mechanism or component that processes data, signals or other information. A processor may include a microcontroller, a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 408 is typically provided in device 400 for access by the processor 402, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 402 and/or integrated therewith. Memory 408 can store software operating on the server device 400 by the processor 402, including one or more applications 410. In some implementations, applications 410 can include instructions that enable processor 402 to perform the functions described herein, e.g., some or all of the method of FIG. 3.

For example, applications 410 can include a gas dispensing application 410. In some implementations, the gas dispensing application 410 can include receiving automatic control signals, receiving user input via a control panel 416 (e.g., 200), controlling gas dispensing, providing alert signals (e.g., pressure and/or backflow), and providing output on a display/control panel device 416. Any of software in memory 408 can alternatively be stored on any other suitable storage location or computer-readable medium. In addition, memory 408 (and/or other connected storage device(s)) can store control settings, bubble counts and data used in the features described herein. Memory 408 and any other type of storage (magnetic disk, optical disk, magnetic tape, or other tangible media) can be considered "storage" or "storage devices."

Control system interface 404 can provide circuitry and functions to enable interfacing the gas dispensing controller device 400 with other systems and devices (e.g., a control system 412 such as an aquarium control system). For example, network communication devices, storage devices (e.g., memory and/or database), and input/output devices can communicate via interface 404. In some implementations, the control system interface 404 can connect to a control system 412 via a wired or wireless connection.

Control/display panel 416 (e.g., the control and display panel of FIG. 2) can be connected to device 400 via local connections (e.g., wiring bus) and/or via networked connections and can be any suitable display device, some examples of which are described below.

For ease of illustration, FIG. 4 shows one block for each of processor 402, control system interface 404, valve control interface 406, memory 408, and control/display panel 416. The valve control interface 406 is connected to and passes information (e.g., signals) to the electrically controlled valve 414. These blocks may represent one or more processors or processing circuitries, operating systems, memories, I/O interfaces, applications, and/or software modules. In other implementations, device 400 may not have all of the components shown and/or may have other elements including other types of elements instead of, or in addition to, those shown herein. While the electronic gas dispensing controller 102 is described as performing operations as described in some implementations herein, any suitable component or combination of components of controller 102 or similar system, or any suitable processor or processors associated with such a system, may perform the operations described.

A representative system can also implement and/or be used with features described herein, e.g., representative electronic gas dispenser control system 102 having backflow and pressure sensors as shown in FIG. 1. Example representative systems can be computer devices including some similar components as the device 400, e.g., processor(s) 402, control system interface 404, valve control interface 406, memory 408, and control/display panel 416. An operating system, software and applications suitable for the client device can be provided in memory and used by the processor. The display/control panel device 416, for example, can be connected to (or included in) the device 400 to display information and receive user input as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 300) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non-transitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering, control system, and/or aquarium control arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, an electronic gas dispenser control system having backflow and pressure sensors.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A gas dispenser control system comprising:
a processing device coupled to a nontransitory computer readable medium;
a control system interface coupled to the processing device;
one or more display devices coupled to the processing device;
one or more input control elements coupled to the processing device;
an electrically controlled valve coupled to the processing device; and
a backflow sensor coupled to the electrically controlled valve, a gas output line, and an interface module, wherein the interface module is configured to provide a signal from the backflow sensor to the gas dispenser control system, and
wherein the nontransitory computer readable medium has software instructions stored thereon that, when-executed by the processing device, cause the processing device to perform operations including:
actuating the electrically controlled valve for a predetermined time period at a frequency, wherein the frequency is based on one of a control signal received at the processing device from a control system via the control system interface or a manual control value retrieved from the nontransitory computer readable medium.

2. The system of claim 1, further comprising a pressure sensor coupled to a gas supply line and an adjustable pressure valve, wherein the pressure sensor provides a signal to the gas dispenser control system, which provides the signal to the control system.

3. The system of claim 1, wherein the control system interface is a wired interface.

4. The system of claim 1, wherein the control system interface is a wireless interface.

5. The system of claim 1, wherein the input control elements include one or more of an automatic/manual control, a bubble counter reset control, a manual slower control, and a manual faster control.

6. The system of claim 1, wherein the one or more display devices include one or more of a bubble counter display, a mode indicator, a frequency indicator, and a bubble release indicator.

7. A gas dispenser control system comprising:
a processing device coupled to a nontransitory computer readable medium;
a control system interface coupled to the processing device;
one or more display devices coupled to the processing device;
one or more input control elements coupled to the processing device, wherein the input control elements include one or more of an automatic/manual control, a bubble counter reset control, a manual slower control, and a manual faster control; and
an electrically controlled valve coupled to the processing device, wherein the nontransitory computer readable medium has software instructions stored thereon that, when executed by the processing device, cause the processing device to perform operations including:

actuating the electrically controlled valve for a predetermined time period at a frequency, wherein the frequency is based on one of a control signal received at the processing device from a control system via the control system interface or a manual control value retrieved from the nontransitory computer readable medium.

8. The system of claim 7, wherein the control system interface is a wired interface.

9. The system of claim 7, wherein the control system interface is a wireless interface.

10. The system of claim 7, further comprising a pressure sensor coupled to a gas supply line and an adjustable pressure valve, wherein the pressure sensor provides a signal to the gas dispenser control system, which provides the signal to the control system.

11. The system of claim 7, wherein the one or more display devices include one or more of a bubble counter display, a mode indicator, a frequency indicator, and a bubble release indicator.

12. A gas dispenser control system comprising:
a processing device coupled to a nontransitory computer readable medium;
a control system interface coupled to the processing device;
one or more display devices coupled to the processing device, wherein the one or more display devices include one or more of a bubble counter display, a mode indicator, a frequency indicator, and a bubble release indicator;
one or more input control elements coupled to the processing device; and
an electrically controlled valve coupled to the processing device,
wherein the nontransitory computer readable medium has software instructions stored thereon that, when executed by the processing device, cause the processing device to perform operations including:
actuating the electrically controlled valve for a predetermined time period at a frequency, wherein the frequency is based on one of a control signal received at the processing device from a control system via the control system interface or a manual control value retrieved from the nontransitory computer readable medium.

13. The system of claim 12, wherein the control system interface is a wired interface.

14. The system of claim 12, wherein the control system interface is a wireless interface.

15. The system of claim 12, further comprising a pressure sensor coupled to a gas supply line and an adjustable pressure valve, wherein the pressure sensor provides a signal to the gas dispenser control system, which provides the signal to the control system.

16. The system of claim 12, wherein the input control elements include one or more of an automatic/manual control, a bubble counter reset control, a manual slower control, and a manual faster control.

* * * * *